(12) United States Patent
Sano et al.

(10) Patent No.: US 8,771,912 B2
(45) Date of Patent: Jul. 8, 2014

(54) EMULSION COLORING MATERIALS FOR INK JET PRINTERS AND METHODS OF PRODUCING THE SAME

(75) Inventors: Kenji Sano, Tokyo (JP); Satoshi Takayama, Kanagawa (JP); Takeshi Gotanda, Kanagawa (JP); Yumiko Sekiguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 556 days.

(21) Appl. No.: 12/417,202

(22) Filed: Apr. 2, 2009

(65) Prior Publication Data

US 2010/0021840 A1    Jan. 28, 2010

(30) Foreign Application Priority Data

Jul. 24, 2008   (JP) .................................. 2008-191353

(51) Int. Cl.
   *G03G 9/00*      (2006.01)
   *G03G 9/087*     (2006.01)
   *G03G 9/09*      (2006.01)

(52) U.S. Cl.
   USPC .... 430/109.1; 430/112; 430/113; 430/137.22

(58) Field of Classification Search
   USPC ........................... 430/113, 109.1, 112, 137.22
   See application file for complete search history.

(56) References Cited

U.S. PATENT DOCUMENTS

| | | | | |
|---|---|---|---|---|
| 4,692,188 | A | * | 9/1987 | Ober et al. ..................... 523/300 |
| 5,922,115 | A | | 7/1999 | Sano et al. |
| 6,770,125 | B2 | * | 8/2004 | Chen et al. ................. 106/31.18 |
| 2006/0111237 | A1 | * | 5/2006 | Takayama et al. ............ 503/221 |

FOREIGN PATENT DOCUMENTS

| | | |
|---|---|---|
| JP | 10-244760 | 9/1998 |
| JP | 2001-172535 | 6/2001 |
| JP | 2001-220530 | 8/2001 |
| JP | 2001-247807 | 9/2001 |
| JP | 2001-271016 | 10/2001 |
| JP | 3520275 | 2/2004 |
| JP | 3786193 | 3/2006 |
| JP | 3878504 | 11/2006 |
| JP | 3971939 | 6/2007 |

OTHER PUBLICATIONS

Office Action issued Aug. 13, 2013, in Japan Patent Application No. 2008-191353.

* cited by examiner

*Primary Examiner* — Thorl Chea
(74) *Attorney, Agent, or Firm* — Oblon, Spivak, McClelland, Maier & Neustadt, L.L.P.

(57) ABSTRACT

There is provided an emulsion coloring material which can be used on ordinary paper, has good color developability, and can be used for conventional erasable pens or printing inks of black or blue color, having sufficiently high densities. When use is made of an erasable emulsion coloring material capable of controlling color development and decolorization by the presence or absence of the interaction between a chromatic material and a color developer, the colored emulsion comprising a copolymer resin of at least one unit selected from styrene and styrene derivatives and at least one unit selected from an acrylic acid ester and a methacrylic acid ester having a substituent which comprises a carbon chain having 4 or more carbon atoms, coloring ability can be enhanced.

15 Claims, 1 Drawing Sheet

Results
| | Diam. (nm) | % Intensity | Width(nm) |
|---|---|---|---|
| Z-Average(d. nm): 80.9 Peak 1: | 85.9 | 100.0 | 21.7 |
| PdI: 0.043 Peak 2: | 0.00 | 0.0 | 0.00 |
| Intercept: 0.977 Peak 3: | 0.00 | 0.0 | 0.00 |
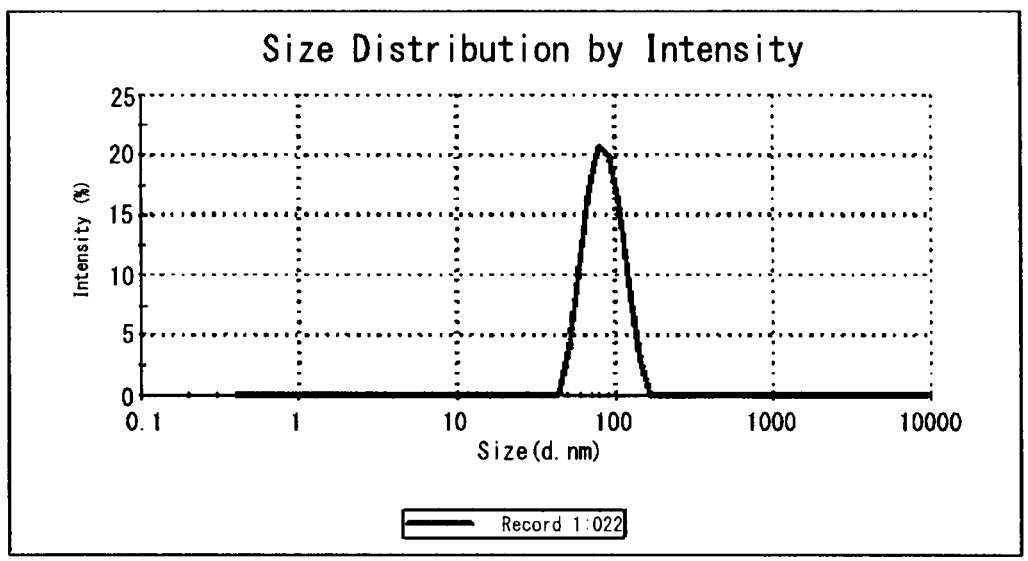

EMULSION COLORING MATERIALS FOR INK JET PRINTERS AND METHODS OF PRODUCING THE SAME

CROSS-REFERENCE TO RELATED APPLICATION

This application is based upon and claims the benefit of priority from Japanese Patent Applications No. 2008-191353, filed on Jul. 24, 2008, the entire contents of which are incorporated herein by reference.

FIELD OF THE INVENTION

The present invention relates to an emulsion coloring material capable of erasing an image by heating or by contact with an organic solvent and to a method of producing the emulsion coloring material.

BACKGROUND OF THE INVENTION

It is absolutely essential to conserve forests for the protection of the global atmosphere and for suppressing the greenhouse effect of $CO_2$. A large problem is posed as to how to efficiently utilize paper resources held now to maintain new logging to a minimum and to keep the balance with the regeneration of forests including afforestation. The current reuse of paper resources is the so-called "recycle" in which paper fibers processed through the deinking step for peeling image formation materials are subjected to paper-remaking to make low-quality paper, which is used in a different application according to its purpose. However, it is pointed out that the current reuse of paper resources involves the problems concerning the high cost of the deinking step and new environmental pollution caused by the treatment of waste fluids.

As image erasable image formation materials which have been used so far, there is an example applied to a toner used in the electro-photographic printing system. This toner is obtained as an image formation material by blending a material of which the image can be erased by heat or an organic solvent with a toner binder. However, it is necessary to heat to fix the toner in this electro-photographic printing system and there is a room for contrivance in view of energy saving. Also, when an erasable image formation material is used as a toner, this gives rise to the problem that if heat is added to erase an image, dyes disappear but the resin remains and the image can be incompletely erased. This is the reason why the utilization method resistant to the residence of a resin. This remaining of the resin is the reason why the erasing method is not so popular so far.

In light of this situation, an image formation method using an ink jet system is investigated instead of the electro-photographic printing method. The ink jet printing and offset printing are different from printing using a toner in the point that they require no heating equipment used to fix the toner. If an erasable image formation material is utilized in the ink jet or offset printing, this material is expected to enable more efficient utilization of resources and to produce the effect of reducing the gas giving the greenhouse effect. The possibility of printing using a usual ink jet printer makes it easy to introduce a printer using erasable ink even for a domestic use. The reasons mentioned above very increase the necessity of the erasable ink usable in the ink jet or offset printing.

The inventors of the present invention have paid their attentions to such a phenomenon that an increase in the interaction between a chromatic material (leuco dye) and a color developer puts the chromatic material into a color developed state whereas a decrease in the interaction puts the chromatic material into a decolored state, to develop an image formation material so far. An image formation material comprising a chromatic material and a color developer can stably exhibits a color-developed state at temperatures around ambient temperature. Moreover, an image drawn using the image formation material can be sufficiently decolored only by treating plain paper by using heat or an organic solvent without adding a decoloring agent used to catch the color developer to the image formation material. Then, the decolored state can be maintained at a practical temperature for a long period of time. The inventors of the present invention have proposed an image erasing process and an image erasing device in relation to these image formation materials as reuse technologies of paper. These image formation materials keep the color developing state and decolored state of an image highly stably and the material highly safe, are applicable to all of the electro-photographic toners, liquid inks, ink ribbons and writing instruments and enable large-scale erasing treatment, showing that these image formation materials have merits that have not been obtained by conventional technologies.

Liquid erasable ink using an emulsion is conventionally known as disclosed in JP-A2002-294104 (KOKAI) (Patent Document 1). This erasable ink is used in the form of an emulsion, suspension or dispersion solution, in which basically, high-molecular microparticles are dyed with a chromatic material and a color developer and decolored by a decoloring agent. The emulsion resin described in JP-A 2002-294104 (KOKAI) is a polymer or copolymer resin of a monomer such as acrylonitrile, styrene, acrylic acid, methacrylic acid, methylacrylate or methylmethacrylate.

However, erasable inks using these resins have the drawbacks that they are considerably inferior in color developing ability and coloring ability to usual non-erasable inks. Therefore, these inks have large problems as to how to improve the color developing ability and coloring ability of the ink for colors, such as black or blue, which are less practicable if these color densities are not deep. The technologies described in Patent Document 1 did not more than put writing instruments to practical use which exhibited a pink or yellow color which might be light to accomplish the purpose satisfactorily. These inks were not adopted for ink jet and offset inks because they have deteriorated coloring ability. Moreover, the technologies described in Patent Document 1 have the problem that the coloring temperature of the emulsion is as relatively higher as 50°C.

SUMMARY OF THE INVENTION

An emulsion coloring material according to an embodiment of the present invention includes an emulsion comprising a copolymer resin of at least one unit selected from styrene and styrene derivatives and at least one unit selected from an acrylate and methacrylate, a chromatic material and a color developer.

The above acrylate and methacrylate are those represented by the following Chemical Formula (1) and the substituent represented by R1 in this Formula (1) comprises a carbon chain having 4 or more carbon atoms.

Chemical Formula (1)

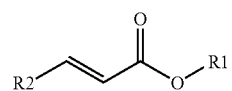

(In the formula, R2 represents hydrogen or a methyl group.)

A method of producing an image formation material according to an embodiment of the present invention including mixing, at a temperature of 30° C. or less than 30° C., an emulsion comprising a copolymer resin of at least one unit selected from styrene and styrene derivatives and at least one unit selected from an acrylic acid ester and a methacrylic acid ester, a chromatic material and a color developer.

The method of producing an erasable image formation material according to an embodiment of the present invention can provide an image formation material which is produced simply, develops a color at its maximum and high erasing ability. This image formation material may be used not only for usual ink such as offset ink and ink for writing instruments but also ink for ink jet printers and has a wide range of industrial applications.

BRIEF DESCRIPTION OF THE DRAWINGS

FIG. 1 is a graph showing the results of measurement of the particle diameter of an emulsion coloring material.

DETAILED DESCRIPTION OF THE EMBODIMENTS

The inventors of the present invention have made various studies to produce an image formation material usable for usual pen or printing ink comprising a chromatic material and a color developer and as a result, found the following fact.

In order to improve the coloring ability, the inventors have made various studies as to an emulsion that is mixed and dispersed in a reaction product of a chromatic material and a color developer to exhibit a color. As a result, the inventors have found that the coloring ability is improved by using an emulsion comprising a copolymer resin of styrene and/or a styrene derivative and an acrylate and/or methacrylate including a substituent comprising a carbon chain having 4 or more carbon atoms, the emulsion being different from that described in the Patent Document 1. The colored emulsion may be used as an image forming material which has a deep concentration and is erasable by heat or an organic solvent.

Moreover, the inventors paid their attentions on the interaction between the chromatic material and the color developer to improve the coloring ability. The inventors directed their attentions to an improvement in color developing ability which is made by stabilizing the interaction between the chromatic material and the color developer. It is important to stabilize the bond between the chromatic material and the color developer to the extent that the decoloring ability is not adversely affected.

As to the problem, the inventors also have made various studies and as a result, found that specific microparticles stabilizes the interaction between the chromatic material and the color developer to improve the color developing ability. This specific microparticles are ones to which a reaction product (a compound obtained by the reaction of the chromatic material with the color developer based on the interaction) is adhered, are less reactive, and are insoluble in an organic solvent. The reaction product of the chromatic material and the color developer is made to adhere to these microparticles to stabilize the interaction of the reaction product to the extent that the decoloring ability is not adversely affected. An emulsion coloring material obtained by adding the emulsion to the microparticle powder to which the chromatic material and the color developer are made to adhere can be used as deep color ink which is erasable by heat or a solvent.

Also, in the method of producing an emulsion coloring material in this embodiment, the emulsion can be colored in the mixing under a low-temperature condition at a temperature of 30° C. or less when the chromatic material and the color developer are mixed with the emulsion to produce the emulsion coloring material. Even in the case where microparticles insoluble in an organic solvent is used together, the coloring and mixing of the emulsion can be likewise made at 30° C. or less. Moreover, even if the coloring and mixing temperature is 30° C. or less, the color developing ability, coloring ability and decoloring ability are less adversely affected than those in the coloring under a high-temperature condition at 50° C. or more.

Also, the emulsion coloring material in this embodiment is of such a nature that it sinks into paper. Therefore, the emulsion coloring material also has the advantage that the resin scarcely remains on a paper surface after decolored and it is therefore superior in decoloring ability of an image to be drawn.

Each component used in the image formation material according to the embodiment will be explained by way of specific examples. In the following explanations, the chromatic material, color developer, resin comprised in the emulsion and core agent which is the microparticles insoluble in an organic solvent will be explained in this order.

Examples of the chromatic material include electron-donating organic materials such as leucoauramines, diarylphthalides, polyarylcarbinols, acylauramines, arylauramines, rhodamine β-lactams, indolines, spiropyrans and fluorans. Specific examples of the chromatic materials include crystal violet lactone (CVL), malachite green lactone, 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)fluoran, 2-chloro-6-(diethylamino) fluoran, 7-(N,N-dibenzylamino)-3-(N,N-diethylamino) fluoran, 3,6-bis(diethylamino)fluoran-γ-(4'-nitro) anilinolactam, 3-diethylaminobenzo[a]-fluoran, 3-diethylamino-6-methyl-7-aminofluoran, 3-diethylamino-7-xylidinofluoran, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl)phthalide, 3-diethylamino-7-chloroanilinofluoran, 3-diethylamino-7,8-benzofluoran, 3,3-bis(1-n-butyl-2-methylindole-3-yl)phthalide, 3,6-dimethylethoxyfluoran, 3-diethylamino-6-methoxy-7-aminofluoran, DEPM, ATP, ETAC, 2-(2-chloroanilino)-6-dibutylaminofluoran, crystal violet carbinol, malachite green carbinol, N-(2,3-dichlorophenyl) leucoauramine, N-benzoylauramine, rhodamine B lactam, N-acetylauramine, N-phenylauramine, 2-(phenyliminoethanedilidene)-3,3-dimethylindoline, N-3,3-trimethylindolinobenzospiropyran, 8'-methoxy-N-3,3-trimethylindolinobenzospiropyran, 3-diethylamino-6-methyl-7-chlorofluoran, 3-diethylamino-7-methoxyfluoran, 3-diethylamino-6-benzyloxyfluoran, 1,2-dibenzo-6-diethylaminofluoran, 3,6-di-p-toluidino-4,5-dimethylfluoran, phenylhydrazide-γ-lactam and 3-amino-5-methylfluoran. These compounds may be used either singly or in combinations of two or more. Various color-developed states are obtained by selecting appropriate ones from among these chromatic materials, which enables color-correspondence with ease. Among these materials, particularly preferable materials are triphenylmethane type, fluoran type or phenylindole-phthalide type chromatic materials.

Examples of the color developer include phenols, phenol metal salts, metal carboxylates, benzophenones, sulfonic acids, sulfonates, phosphates, metal phosphates, acidic phosphates, acidic metal phosphates, phosphites and metal phosphites. Among these materials, particularly preferable materials include gallic acid; gallates such as methyl gallate, ethyl gallate, n-propyl gallate, i-propyl gallate and butyl gallate; dihydroxybenzoic acid and its esters such as 2,3-dihydroxybenzoic acid and methyl 3,5-dihydroxybenzoate; hydroxyacetophenones such as 2,4-dihydroxyacetophenone, 2,5-dihydroxyacetophenone, 2,6-dihydroxyacetophenone, 3,5-dihydroxyacetophenone and 2,3,4-trihydroxyacetophenone; hydroxybenzophenones such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone and 2,3,4,4'-tetrahydroxybenzophenone; biphenols such as 2,4'-biphenol and 4,4'-biphenoli; and polyhydric phenols such as 4-[(4-hydroxyphenyl)methyl]-1,2,3-benzenetriol, 4-[(3,5-dimethyl-4-hydroxyphenyl)methyl]-1,2,3-benzenetriol, 4,6-bis [(3,5-dimethyl-4-hydroxyphenyl)methyl]-1,2,3-benzenetriol, 4,4'-[1,4-phenylenebis(1-methylethylidene)bis (benzene-1,2,3-triol)], 4,4'-[1,4-phenylenebis(1-methylethylidene)bis(1,2-benzenediol)], 4,4',4"-ethylidenetrisphenol, 4,4'-(1-methylethylidene)bisphenol and methylenetris-p-cresol. These compounds may be used either singly or in combinations of two or more.

Examples of the resin comprised in the emulsion include copolymer resins of at least one unit selected from styrene and styrene derivatives and at least one unit selected from acrylate and methacrylate, which are selected from monomers including styrene and styrene derivatives such as o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene, and acrylates or methacrylates such as n-butylacrylate, isobutylacrylate, tert-butylacrylate, sec-butylacrylate, 2-butoxymethylacrylate, pentylacrylate, 2-methylpentylacrylate, 2,2-dimethylpropylacrylate, 3-dimethylaminopropylacrylate, 2-ethylhexylacrylate, decylacrylate, dodecylacrylate, n-butylmethacrylate, isobutylmethacrylate, tert-butylmethacrylate, sec-butylmethacrylate, 2-butoxymethylmethacrylate, pentylmethacrylate, 2-methylpentylmethacrylate, 2,2-dimethylpropylmethacrylate, 2-ethylhexylmethacrylate, decylmethacrylate, dodecylmethacrylate and 3-dimethylaminopropylmethacrylate. Copolymer resins synthesized from one or two or more monomers selected from the styrene or styrene derivatives and acrylates or methacrylates may be used.

In such a copolymer resin, the copolymerization ratio of styrene or/and a styrene derivative to an acrylate or/and methacrylate is preferably in a range from 9.5:0.5 to 7:3. When the ratio of styrene or its derivative is less than the range, this gives rise to the problem concerning color developing inferior, whereas when this ratio exceeds the range, this gives rise to the problem concerning Tg and therefore, the ratio out of the range is undesirable.

The molecular weight of this copolymer is preferably in a range from 10000 to 20000. When the molecular weight of the copolymer is less than the range, this gives rise to the problem concerning the mechanical stress stability of the emulsion, whereas when the molecular weight exceeds the range, this gives rise to the problem concerning coating ability during drying, and therefore, the molecular weight out of the range is undesirable.

The copolymer resin is desired to be a resin having a three-dimensional structure enabling satisfactory interaction with a reaction product of the chromatic material and the color developer to obtain high coloring ability. Among the examples given above, a copolymer resin of styrene and an acrylate or/and methacrylate in which the carbon chain having substituent has four or more carbon atoms is preferable. If the number of carbon atoms of the substituent in an acrylate or/and methacrylate is small, this is undesirable even in the case of using a copolymer resin of styrene and/or styrene derivative and an acrylate or/and methacrylate, because the steric hindrance of the copolymer resin is small, which makes easy the interaction between a carboxyl group of the acrylic acid or methacrylic acid exposed from the surface of the resin and the color developer, leading to a deterioration in color developing ability when the emulsion is colored. It is considered that the interaction between a methyl group of a methacrylate and a carboxylic group is small because of the chemical structure in which a double bond exists in the vicinity of the methyl group of the methacrylate. Even if the interaction of the methyl group of the methacrylate is produced, the influence of the ester substituent is large and therefore the influence of the methyl group of methacrylic acid is at a negligible level because the ester substituent has mobility and its carbon chain is longer than a methyl group. Therefore, in the present invention, the methacrylate and the acrylate are considered to be of the same nature from the viewpoint of the decoloring ability and also from the viewpoint of color developing ability and coloring ability, these abilities being effected by the carboxyl group of the resin. Among copolymer resins of styrene or/an a styrene derivative and an acrylate or/and methacrylate comprising a carbon chain in which the substituent has four or more carbon atoms, a copolymer resin of styrene and n-butylacrylate or 2-ethylhexylacrylate is preferable from the viewpoint of generality and cost. Also, additives such as a surfactant, antiseptic and rust preventive which are usually used as other image formation materials may be added. This is on the premise that the color developing ability, coloring ability and decoloring ability of the coloring material are not adversely affected.

Components such as surfactants comprised in usual emulsions are comprised in the above emulsion. Then, the proportion of the resin comprised in the emulsion is the same as that used in general ink.

In this invention, the solid concentration of the emulsion is preferably in a range from 3 to 15% by weight. When this concentration is less than the above range, this gives rise to the problem concerning a reduction in the color density of an image to be formed, whereas the solid concentration exceeds the above range, this is undesirable because the higher solid concentration is a cause of clogging of an ink jet printer.

The core agent which is used as the microparticles insoluble in an organic solvent is preferably less reactive microparticles and examples of the core agent include silica microparticles, alumina microparticles and starch. Examples of the silica microparticles include products from Ebonic Degussa Japan Company, for example, Aerogyl R972, Aerogyl R972V, Aerogyl R972CF, Aerogyl R974, Aerogyl R202, Aerogyl R805, Aerogyl R812, Aerogyl R812S, Aerogyl RX50, Aerogyl RX200, Aerogyl OX50 and Aerogyl TT600. The Aerogyl is the trademark of Degussa Aktien Gesellschaft. Among the examples given above, Aerogyl R202, Aerogyl R972, Aerogyl RX50 and Aerogyl RX200 have excellent color developing ability, coloring ability and decoloring ability and are preferable as the microparticles insoluble in an organic solvent as the core agent. Alumina microparticles and starch may be used as long as they are less reactive. Also, one or more of these microparticles may be used to produce an erasable emulsion coloring material.

If the microparticles have a functional group having high reaction activity, there is the possibility of highly active microparticles reacting with the chromatic material when the chromatic material is reacted with the color developer. If the microparticles are reacted with the chromatic material to form a stable bond, there is the possibility of formation of an emulsion coloring material which cannot be easily erased. Therefore, in the case where a highly reactive functional group is present, microparticles reduced in activity by protecting the protective group are preferable. Then, the microparticles as the core agent are preferably stuck to a reaction product of the chromatic material and the color developer not by a chemical bond but by an action such as physical adsorption in view of the color developing ability and decoloring ability. Even if unprocessed starch particles insoluble in an organic solvent are used, a dye powder superior in color developing and decoloring abilities can be obtained. The microparticles insoluble in an organic solvent may be comprised to the extent that the characteristics of the emulsion coloring material are not adversely affected.

EXAMPLES

The invention will be explained in more detail by way of examples, which are not intended to be limiting of the invention. In the method of producing each emulsion coloring material, any process for which there is no description of process temperature is carried out at ambient temperature (25° C.).

Example 1

0.1 g of crystal violet lactone (manufactured by Yamada Chemical Co., Ltd) used as a chromatic material, 0.05 g of ethyl gallate used as a color developer, 5.0 g of an emulsion solution produced using a resin having a copolymer composition described in Table 1 below and 5.0 g of water were added in a container placed in a 14° C. thermostat and mixed and stirred by a magnetic stirrer. The mixture was subjected to filtration to remove coarse particles, thereby obtaining a blue emulsion coloring material.

Using different emulsion solutions were used to produce five types of blue emulsion coloring materials, and these five types of emulsion coloring materials were subjected to a test for quantitatively evaluate the coloring ability (blueness and concentration of the color of each emulsion coloring material)

The blueness and concentration of the color of the obtained emulsion coloring material were evaluated. The blue emulsion coloring material was measured using a color difference meter. The data of the obtained $L^*a^*b^*$ color specification system (see Japanese Industrial Standards Z 8729) is shown in Table 1. It was found from the results shown in Table 1 that the emulsion comprising the resin having the following composition: styrene:2-ethylhexylacrylate=90:10 (Emulsion-01 in Table 4; anionic type, 71 nm, solid content: 25.3%, pH: 7.4, Tg: 79° C.) was a coloring material having the deepest blueness (blueness is deeper as the absolute value of the b value increases when the b value is minus). This was the result that was not contradictory to visual ratings. Then, the color was reproduced using the obtained data of $L^*a^*b^*$ color specification system to digitize the reproduced color as the concentration of color (color density) with 256 gradations. The results digitized using 256 gradations are shown in Table 2. As the standard of color density, each color density of yellow, cyan and blue in the RGB color specification system (see, Japanese Industrial Standards Z 8102) was digitized using 256 gradations to make comparison. The results obtained by digitizing each color density of yellow, cyan and blue using 256 gradations are shown in Table 3. In these 256 gradations, 0 is black and 255 is white. This shows that in the evaluation of color density, the smaller the number is, the more dense the color is. From the results shown in Table 2, the emulsion comprising a resin having the composition: styrene:2-ethylhexylacrylate=90:10 had the most dense color and the emulsions comprising resins having other compositions each had lower concentrations than the above emulsion. Also, from the results shown in Table 3, the emulsion comprising a resin having the composition: styrene:2-ethylhexylacrylate=90:10 had such a high color density as to be close to blue as compared with the RGB color.

TABLE 1

| Ratio of the resin composition of the emulsion | | Measured value of $L^*a^*b^*$ system | | |
|---|---|---|---|---|
| Styrene (%) | 2-ethylhexylacrylate (%) | L | a | b |
| 90 | 10 | 37.57 | 32.62 | −61.56 |
| 70 | 30 | 45.42 | 23.93 | −57.69 |
| 67 | 33 | 46.28 | 23.72 | −58.26 |
| 64 | 36 | 46.08 | 23.18 | −57.43 |
| 61 | 39 | 49.63 | 19.06 | −54.54 |

TABLE 2

| Ratio of the resin composition of the emulsion | | 256 |
|---|---|---|
| Styrene (%) | 2-ethylhexylacrylate (%) | gradation-density |
| 90 | 10 | 103 |
| 70 | 30 | 124 |
| 67 | 33 | 126 |
| 64 | 36 | 125 |
| 61 | 39 | 132 |

TABLE 3

| | Control color | 256 gradation-density |
|---|---|---|
| yellow | R: 255 G: 255 B: 0 | |
| Cyan | R: 0 G: 255 B: 255 | 170 |
| Blue | R: 0 G: 0 B: 255 | 85 |

Example 2

0.2 g of crystal violet lactone (manufactured by Yamada Chemical Co., Ltd) used as a chromatic material, 0.1 g of 2,4-dihydroxybenzophenone used as a color developer and 20 ml of an emulsion (emulsion-01 in Table 4; styrene:2-ethylhexylacrylate=90:10) in a container placed in a 18° C. thermostat and mixed and stirred by a magnetic stirrer. After stirred several hours, the mixed solution exhibited deep blue. After the mixed solution was allowed to stand over night, the obtained blue emulsion coloring material was subjected to filtration to remove coarse particles. This blue emulsion coloring material solution was dripped on paper using a capillary to draw an image. As a method of erasing image, a 200° C. iron was used to apply heat to confirm that the image was erased.

The particle diameter of the emulsion coloring material produced in the above method was measured.

The filtered emulsion coloring material was subjected to a syringe filter having a filter diameter of 1 μm to further remove coarse particles, thereby measuring the particle diameter by the dynamic light scattering method. One of the measured results is shown in FIG. 1. The measurement was made three times, to find that the particle distribution having a single peak was obtained in any of these measurements. Then, the average particle diameter in these three measurements was 79.4 nm. From the result that the only single peak was observed, it was confirmed that the emulsion was colored.

Example 3

0.1 g of crystal violet lactone (manufactured by Yamada Chemical Co., Ltd) used as a chromatic material, 0.052 g of 2,4-dihydroxybenzophenone used as a color developer and 20.0 ml of an emulsion (emulsion-01 in Table 4; styrene:2-ethylhexylacrylate=90:10) in a container placed in a 18° C. thermostat and mixed and stirred by a magnetic stirrer. After stirred several hours, the mixed solution exhibited deep blue. After the mixed solution was allowed to stand over night, the obtained blue emulsion coloring material was subjected to filtration to remove coarse particles to produce a blue emulsion coloring material solution.

The blue emulsion coloring material solution obtained above was subjected to an experiment to evaluate the drawn image on paper and the thermal decoloring ability.

The solution was dripped on paper using a capillary to draw an image. As a method of erasing image, a 200° C. iron was used to apply heat to evaluate the decoloring ability to confirm that the image was satisfactorily erased. The fact that an image drawn using a capillary which is a fine tube and the decoloring ability can be evaluated shows that the blue emulsion coloring material can be used not only for writing instruments and offset printing but also for ink jet printing and the like.

Examples 4 to 10, Comparative Examples 1 to 11

Emulsion coloring materials were produced in the same manner as in Example 3 except that plural emulsions and waxes as shown in Table 4 were used. With regards to each of these emulsions and waxes, the coloring ability was evaluated.

The results of the evaluation of coloring ability of Examples 3 to 10 and Comparative Examples 1 to 11 are shown in Table 4.

TABLE 4

| Example/ Comparative Example | Name of the emulsion | Composition of the resin (excluding wax) |
|---|---|---|
| Example 3 | Emulsion-01 | Stylene: 90%, 2-ethylhexylacrylate: 10% |
| Example 4 | Emulsion-02 | Stylene: 70%, 2-ethylhexylacrylate: 30% |
| Example 5 | Emulsion-03 | Stylene: 90%, 2-ethylhexylacrylate: 10% |
| Example 6 | Emulsion-04 | Stylene: 90%, 2-ethylhexylacrylate: 10% |
| Example 7 | Emulsion-05 | Stylene: 67%, 2-ethylhexylacrylate: 33% |
| Example 8 | Emulsion-06 | Stylene: 64%, 2-ethylhexylacrylate: 36% |
| Example 9 | Emulsion-07 | Stylene: 61%, 2-ethylhexylacrylate: 39% |
| Example 10 | Emulsion-08 | Stylene: 50%, 2-ethylhexylacrylate: 50% |
| Comparative Example 1 | Emulsion-09 | Stylene: 85%, 2-ethylhexylacrylate: 10%, Dibutyl diglycol: 5% |
| Comparative Example 2 | Emulsion-10 | Stylene: 82%, 2-ethylhexylacrylate: 9%, Dibutyl diglycol: 9% |
| Comparative Example 3 | Emulsion-11 | Stylene: 75%, 2-ethylhexylacrylate: 8%, Dibutyl diglycol: 17% |
| Comparative Example 4 | Emulsion-12 | Stylene: 70%, 2-ethylhexylacrylate: 7%, Dibutyl diglycol: 23% |
| Comparative Example 5 | Emulsion-13 | Stylene: 50%, 2-ethylhexylacrylate: 25%, Methylmethacrylate: 25% |
| Comparative Example 6 | Emulsion-14 | Acrylonitrile butadiene type |
| Comparative Example 7 | Emulsion-15 | Styrene/ butadiene type |
| Comparative Example 8 | Emulsion-16 | Acrylonitrile butadiene type |
| Comparative Example 9 | Emulsion-17 | Modified Styrene/ butadiene type |
| Comparative Example 10 | Wax-01 | Wax |
| Comparative Example 11 | Wax-02 | Wax |

| Example/ Comparative Example | Tg | pH | Results of coloring |
|---|---|---|---|
| Example 3 | 79 | 7.4 | A |
| Example 4 | 39 | 7.8 | B |
| Example 5 | 87 | 7.4 | A |
| Example 6 | 82 | 7.5 | A |
| Example 7 | 33 | 7.1 | B |
| Example 8 | 26 | 7.5 | B |
| Example 9 | 21 | 7.5 | B |
| Example 10 | | 9.0 | B |
| Comparative Example 1 | 81 | 7.7 | C |
| Comparative Example 2 | 81 | 7.2 | C |
| Comparative Example 3 | 80 | 8.0 | C |
| Comparative Example 4 | 79 | 8.0 | C |
| Comparative Example 5 | | 8.5 | C |
| Comparative Example 6 | −48 | 9.5 | C |
| Comparative Example 7 | 0 | 7.0 | C |
| Comparative Example 8 | −20 | 7.5 | C |
| Comparative Example 9 | −10 | 8.0 | C |
| Comparative Example 10 | | 10.0 | C |
| Comparative Example 11 | | 7.7 | C |

Results of coloring
A: The coloring ability is very good.
B: The coloring ability is good.
C: The coloring ability is not good.

The emulsion comprising the copolymer resin having butyl as the substituent had the same coloring ability as the emulsion comprising the copolymer resin having 2-ethylhexyl as the substituent. Also, it was confirmed that the addition of a plasticizer such as dibutyl glycol impaired the coloring ability regardless of the amount of the plasticizer. It is considered that a polar group of dibutyl glycol interacted with the coloring material to function as a decoloring agent. The emulsion of Comparative Example and the coloring material comprising wax each had inferior coloring ability.

Example 11

0.2 g of crystal violet lactone (manufactured by Yamada Chemical Co., Ltd) used as a chromatic material, 0.1 g of ethyl gallate used as a color developer, 5.0 ml of an emulsion-03 (styrene:2-ethylhexylacrylate=90:10) and 5.0 ml of water were added in a container placed in a 14° C. thermostat and mixed and stirred by a magnetic stirrer. The mixture was allowed to stand overnight and then subjected to filtration to produce a blue emulsion coloring material.

When an image was drawn by dripping the blue emulsion solution on paper by using a capillary and then erased using an iron, to confirm that the image was perfectly erased.

A difference in the coloring ability of the emulsion coloring material depending on a difference in the color developer was evaluated.

The emulsion coloring material using ethyl gallate as the color developer was colored more rapidly in a deeper blue color than the emulsion coloring material using 2,4-dihydroxybenzophenone as the color developer of Example 2. Even if a color developer other than 2,4-dihydroxybenzophenone is used, it is possible to produce an emulsion coloring material which is erasable like the coloring material using 2,4-dihydroxybenzophenone.

Example 12

0.1 g of crystal violet lactone (manufactured by Yamada Chemical Co., Ltd) used as a chromatic material, 0.052 g of 2,4-dihydroxybenzophenone used as a color developer and 0.1 g of Aerogyl RX200 (manufactured by Ebonick Degussa Japan) used as a core agent of silica were mixed in 3 ml of acetone. The dye solution was spread on a vat to vaporize acetone to dry. The obtained powder was ground in a mortar to obtain a blue powder. 1.0 ml of water was added in a container charged with 0.05 g of the obtained blue powder. Then, 1.0 ml of an emulsion-01 (styrene:2-ethylhexylacrylate=90:10) was added to the above mixture. The resulting solution was vigorously stirred with a magnetic stirrer 3mm in size to mix. After one hour, the dispersion solution was subjected to filtration to remove coarse particles to produce a blue emulsion coloring material.

The blue emulsion coloring material which was produced in the above method using the silica microparticles as the microparticles insoluble in an organic solvent was subjected to an experiment to evaluate the thermally decoloring ability of the emulsion.

The blue emulsion coloring material was dripped on paper using a capillary and dried to draw a blue image on the paper. When a 200° C. iron was used to apply heat to the blue image, the blue image was perfectly erased. The fact that an image drawn using a capillary which is a fine tube and the decoloring ability can be evaluated shows that the blue emulsion coloring material can be used not only for writing instruments and offset printing but also for ink jet printing and the like even if microparticles insoluble in an organic solvent are comprised in the coloring material.

Comparative Example 12

An emulsion coloring material was produced in the same manner as in Example 12 except that an emulsion-13 (styrene:2-ethylhexylacrylate:methylmethacrylate=50:25:25) was used in place of the emulsion used in Example 12.

The blue emulsion coloring material produced using the methylmethacrylate-comprising emulsion in the above method was subjected to an experiment for evaluating the ability to color an emulsion. The produced emulsion coloring material temporarily seems to have been dyed. However, when left to stand for a certain time, the powder settled down and was separated from the white emulsion solution. Since methyl methacrylate is comprised in the resin, the interaction between the resin and the reaction product of the chromatic material and the color developer was not favorable. To mention one of the reasons therefore, it is because the substituent of methyl methacrylate was methyl, and this methyl group has low tendency to induce steric hindrance.

Example 13

A black powdery matter was obtained by carrying out the same operation, except that 0.1 g of 6'-[N,N-di(3-methylbuthyl)amino]-3'-methyl-2'-(phenylamino)-spiro[isobenzofuran-1(3H),9'-[9H]xanthen]-3-one (H10301) from Yamada Chemical Co., Ltd. was used instead of the chromatic material of Example 12. To 0.05 g of the resulting black powdery matter, water was not added, but 1.0 ml of Emulsion-01 (styrene:2-ethylhexyl acrylate=90:10) was added. The mixture was vigorously stirred with a 3-mm long magnetic stirrer, to mix the solution. After one hour, the dispersion was filtered to exclude coarse particles, and thus a black emulsion coloring material was produced.

A test for evaluation of decolorability under heating was conducted with the black emulsion coloring material produced by the above-described method, in which silica microparticles had been used as the microparticles insoluble in organic solvents. The erasure performance was evaluated by calculating the reflection ratio.

The produced black emulsion coloring material was dropped on paper with a capillary tube. When dried, a dark image having an average image density of 0.56 was drawn. As the drawn image was heated using an iron at 200° C. to erase the image, the color was completely erased in the areas where coloration was not intense, while the average image density was decreased to 0.1 in the areas where coloration was intense. Thus, the drawn image was well erased.

Example 14

1.0 g of furo[3,4-b]pyridin-5(7H)-one, 7-[4-(diethylamino)-2-hexyloxy]phenyl-7-(1-ethyl-2-methyl-1H-indol-3-yl (Blue 203) from Yamada Chemical Co., Ltd. as a chromatic material, 0.44 g of ethyl gallate as a color developer, and 1.0 g of AEROSIL RX200 (manufactured by Evonik Degussa Japan Co., Ltd.) as the core agent for silica were placed in a vessel, 30 ml of acetone was added as a solvent, and the contents were mixed. The mixed solution was dried under reduced pressure in a rotary evaporator to volatilize acetone. The resulting powdery matter was pounded in a mortar to obtain a blue powdery matter. 0.05 g of this powdery matter was placed in a vessel, and 0.5 ml of the Emulsion-01 (styrene:2-ethylhexyl acrylate=90:10) and 0.55 ml of water were added. The mixture was vigorously stirred with a 3-mm long magnetic stirrer to mix the solution. After one hour, the dispersion was filtered to exclude coarse particles, and thus a blue emulsion coloring material was produced.

A test for evaluation of decolorability under heating was conducted with the blue emulsion coloring material produced by the above-described method, in which silica microparticles had been used as the microparticles insoluble in organic solvents. The erasure performance was evaluated by calculating the reflection ratio.

The produced blue emulsion coloring material was dropped on paper with a capillary tube. When dried, a dark image having an average image density of 0.375 was drawn. As the drawn image was heated using an iron at 200° C. to erase the image, the image disappeared, with the average image density decreased to 0.07.

Example 15

A blue emulsion coloring material was produced by the same method as in Example 14.

An evaluation of decolorability under the action of organic solvent was conducted with the blue emulsion coloring material produced by the above-described method, in which silica microparticles had been used as the microparticles insoluble in organic solvents.

An image was drawn on paper with a capillary tube, using the produced blue emulsion coloring material. When acetone was applied to the extent that acetone soaked the paper, complete decolorization occurred, without any trace left behind.

What is claimed is:

1. An emulsion coloring material for ink jet printer, comprising:
    an emulsion solution comprising water and a copolymer resin of styrene and 2-ethylhexylacrylate or butylacrylate
    a chromatic material; and
    a color developer, wherein
    the ratio of copolymerization of the copolymer resin [(styrene):(2-ethylhexylacrylate or butylacrylate)]is in a range from 7:3 to 9.5:0.5.

2. The coloring material according to claim 1, wherein the concentration of the solids comprised in the emulsion coloring material is 3 to 15% by weight of the emulsion coloring material.

3. The coloring material according to claim 1, wherein the copolymer resin comprises a copolymer that is a styrene:2-ethylhexylacrylate copolymer where the ratio of copolymerization of styrene:2-ethylhexylacrylate is 90:10.

4. The coloring material according to claim 1, wherein said chromatic material is crystal violet lactone, optionally mixed with at least one member selected from the group consisting of a diarylphthalide, a polyarylcarbinol, an acylauramine, an arylauramine, a rhodamine β-lactam, an indoline, and a spiropyran.

5. The coloring material according to claim 1, wherein said chromatic material is at least one member selected from the group consisting of diarylphthalide, a polyarylcarbinol, an acylauramine, an arylauramine, a rhodamine β-lactam, an indoline, a spiropyran, and a fluoran.

6. An emulsion coloring material for ink jet printer, comprising:
    an emulsion solution comprising water and a copolymer resin styrene and 2-ethylhexylacrylate and butylacrylate
    a chromatic material;
    a color developer; and
    microparticles which are insoluble in inorganic solvents, wherein
    the chromatic material and the color developer react to form a reaction product that is present on the microparticles, and
    the ratio of copolymerization of the copolymer resin [(styrene):(2-ethylhexylacrylate or butylacrylate)]
    is in a range from 7:3 to 9.5:0.5.

7. The coloring material according to claim 6, wherein the microparticles are one or more members selected from the group consisting of silica microparticles, alumina fine powders and starches.

8. The coloring material according to claim 6, wherein the concentration of the solids comprised in the emulsion coloring material is 3 to 15% by weight of the emulsion coloring material.

9. The coloring material according to claim 6, wherein the insoluble microparticles are silica microparticles.

10. The coloring material according to claim 6, wherein said chromatic material is crystal violet lactone, optionally mixed with at least one member selected from the group consisting of a diarylphthalide, a polyarylcarbinol, an acylauramine, an arylauramine, a rhodamine β-lactam, an indoline, and a spiropyran.

11. The coloring material according to claim 6, wherein said chromatic material is at least one member selected from the group consisting of diarylphthalide, a polyarylcarbinol, an acylauramine, an arylauramine, a rhodamine β-lactam, an indoline, a spiropyran, and a fluoran.

12. A method for manufacturing an emulsion coloring material for ink jet printer, comprising mixing
    an emulsion comprising:
        an emulsion solution comprising water and a copolymer resin styrene and 2-ethylhexylacrylate or butylacrylate;
        a chromatic material; and
        a color developer or
    mixing an emulsion comprising:
        an emulsion solution comprising water and a copolymer resin styrene and 2-ethylhexylacrylate or butylacrylate;
        a chromatic material;
        a color developer; and
        microparticles which are insoluble in organic solvents, wherein
        the chromatic material and the color developer react to form a reaction product that is present on the microparticles, and
        the mixing temperature is at most 30° C.

13. The method according to claim 12, wherein the ratio of copolymerization of the copolymer resin [(styrene):(2-ethylhexylacrylate or butylacrylate)]
    is in a range from 7:3 to 9.5:0.5.

14. The method according to claim 12, wherein said chromatic material is crystal violet lactone, optionally mixed with at least one member selected from the group consisting of a diarylphthalide, a polyarylcarbinol, an acylauramine, an arylauramine, a rhodamine β-lactam, an indoline, and a spiropyran.

15. The method according to claim 12, wherein said chromatic material is at least one member selected from the group consisting of diarylphthalide, a polyarylcarbinol, an acylauramine, an arylauramine, a rhodamine β-lactam, an indoline, a spiropyran, and a fluoran.

* * * * *